United States Patent Office 3,405,118
Patented Oct. 8, 1968

3,405,118
4-METHOXY-6-NITROBENZOTHIAZOLYLAZO DISPERSE DYES
Mario Francesco Sartori, Wilmington, Del., assignor to E. I. du Pont de Nemours and Company, Wilmington, Del., a corporation of Delaware
No Drawing. Filed Dec. 21, 1965, Ser. No. 515,471
6 Claims. (Cl. 260—158)

ABSTRACT OF THE DISCLOSURE

Azo dyes of the formula

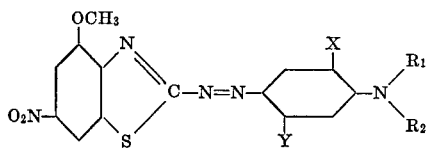

wherein X is Cl, Br, $OCH_3$ or $OC_2H_5$; Y is H, Cl, Br, $CH_3$ $C_2H_5$, $OCH_3$, $OC_2H_5$, $NH_2$ NHCO-alkyl $NHSO_2$-alkyl, NHCO-phenyl or $NHSO_2$-phenyl, in which said phenyl radicals may be substituted by Cl, $NO_2$, CN, $OCH_3$, or alkyl and said alkyls contain 1–4 C-atoms; and $R_1$ and $R_2$ are spearately H, $C_1$–$C_4$ alkyl, $C_2$–$C_4$ hydroxyalkyl, 2-cyanoethyl, alkoxyalkyl having 3 to 4 C-atoms, 2-acetoxyethyl or 2-benzoyloxyethyl, have good brightness, sublimation fastness, lightfastness and tinctorial value on polyester fibers.

---

This invention is directed to valuable monoazo disperse dyes, which are particularly useful for dyeing fibers of the polyester type, such as polyethylene terephthalate fibers.

It has been found that 2-amino-4-methoxy-6-nitrobenzothiazole may be diazotized and coupled with a variety of coupling agents, such as aromatic amines to produce valuable disperse dyes.

Of special interest are the monoazo dyes obtained by coupling diazotized 2-amino-4-methoxy-6-nitrobenzothiazole with aniline derivatives. These dyes give red to blue shades of outstanding brightness and sublimation fastness and which are characterized by surprisingly good lightfastness and high tinctorial value. Most of the violet and blue disperse dyes on the market today, when exposed to artificial light show a flare or shift of the shade toward the red and the fabric dyed with these colors acquire an undesirable red cast. Unexpectedly, the violet to blue dyes of this invention when exposed to artificial light show a desirable bathochromic shift toward the green. This unusual property is used to advantage in dye formulations which contain dyes having a red flare.

These new dyes may, for example, be applied to polyester fibers by standard aqueous methods of dyeing and by the "Thermosol" method. It is an object of the present invention to provide a novel monoazo disperse dye structure which achieves described red to blue dye shades having significantly desirable properties as herein described.

These and other objects of the invention will be apparent from the following description and claims.

More specifically, the dyes of the present invention have the formula:

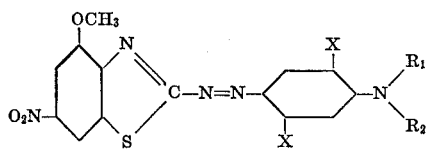

wherein X is selected from the group consisting of Cl, Br, $OCH_3$ and $OC_2H_5$; Y is selected from the group consisting of H, Cl, Br, $CH_3$, $C_2H_5$, $OCH_3$, $OC_2H_5$, $NH_2$, NHCO-alkyl, $NHSO_2$-alkyl, NHCO-phenyl, and $NHSO_2$-phenyl, in which said phenyl radicals may be substituted by Cl, $NO_2$, CN, $OCH_3$, or alkyl and wherein the alkyls contain 1–4 C-atoms; $R_1$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, and 2-benzoyloxyethyl; and $R_2$ is selected from the group consisting of H, $C_1$–$C_4$ alkyl, $C_2$–$C_4$ hydroxyalkyl, 2-cyanoethyl, alkoxyalkyl having 3 to 4 atoms, 2-acetoxyethyl, and 2-benzoyloxyethyl.

Examples of specific dyes of this invention are the following preferred dyes:

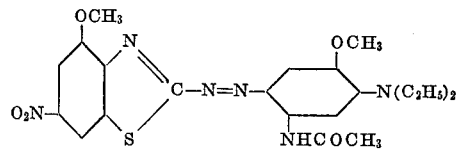

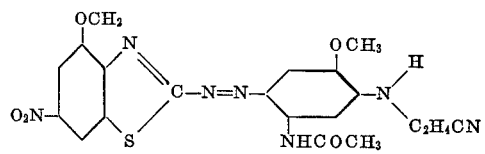

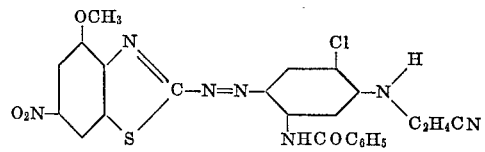

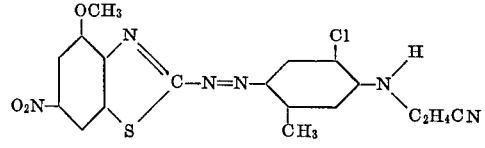

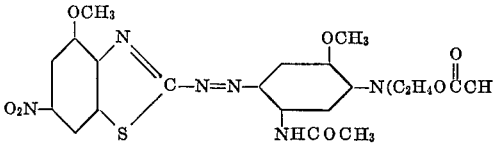

The novel compounds of this invention are prepared by diazotizing 2-amino-4-methoxy-6-nitrobenzothiazole, coupling in acid solution to the chosen coupler, and isolating the product by conventional methods. Isolation may be accomplished by precipitating the dye from acid solution by the addition of water, and then filtering, washing, and drying the precipitate. The above diazo component is prepared as described in Example I(b).

The coupling components are prepared by well known methods, preferably by alkylation of aniline or its derivatives. The N-hydroxyalkyl aryl amines may be acylated to prepare their ester derivatives.

Representative examples further illustrating the invention follow.

EXAMPLE 1

(a) To a solution of nitrosylsulfuric acid, prepared by mixing 0.76 part of sodium nitrite with 15 parts of concentrated sulfuric acid, cooled to 3°–5° C., is added dropwise a mixture of 15 parts of acetic acid and 3 parts of propionic acid, while stirring and allowing the temperature to rise to 15° C. The mixture is then cooled to 2°–3° C. and a solution of 2.25 parts of 2-amino-4-methoxy- 6-nitrobenzothiazole in a mixture of 90 parts of acetic acid and 18 parts of propionic acid is added, while keeping the temperature at 2° to 5° C. The mixture is then stirred at this temperature for 2 hours. An excess of nitrous acid is maintained during this time and is then removed by the addition of small amounts of urea. This diazo solution is then added to a cold solution of 2.6 parts of 3′-[(2-cyanoethyl)ethylamino]-p-acetanisidide in a mixture of 15 parts of acetic acid and 3 parts of propionic acid, the pH being maintained at 4.5–5 by the addition of aqueous sodium acetate solution. After stirring 2 hours at 5° C., 100 parts of water are added and the precipitated dye is filtered off, washed acid-free and dried. The new dye is a blue powder and has the formula:

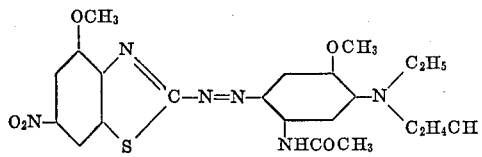

A fabric of polyethylene terephthalate fiber dyed with this new dye has a bright blue shade of good light- and sublimation-fastness.

(b) 2 - amino - 4 - methoxy-6-nitrobenzothiazole employed in part (a) of this example, is prepared as follows: A solution of 15.9 parts of bromine in 30 parts of acetic acid is added in about 30 minutes to a mixture of 16.8 parts of 2-methoxy-4-nitroaniline and 20.2 parts of potassium thiocyanate in 300 parts of acetic acid, keeping the temperature between 25° and 35° C. The slurry is then stirred at room temperature for 24 hours. The yellow precipitate is collected by filtration, slurried in water, made neutral with aqueous ammonia and filtered again. The precipitate is boiled for 15 minutes with excess of 15% hydrochloric acid and the resulting hot solution is clarified by filtration. The filtrate, cooled to 20° C., is made alkaline with aqueous ammonia and the precipitate 2-amino-4-methoxy-6-nitrobenzothiazole is collected by filtration, thereafter washed and dried. It is a yellow powder of M.P. 290–292° C.

*Analysis.*—Calcd. for $C_8H_7N_3O_3S$: C, 42.5; H, 3.1; N, 18.6. Found: C, 42.5; H, 3.2; N, 18.4.

EXAMPLE 2

(a) 2.25 parts of 2-amino-4-methoxy-6-nitrobenzothiazole are diazotized and coupled to 2.4 parts of 3′-diethylamino-p-acetanisidide according to the procedure described in Example 1(a). The new dye, obtained as a dark blue powder, has the formula:

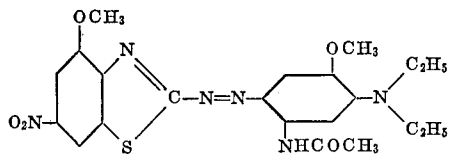

The absorption maximum of this dye in methanol is located at 608 millimicrons. It dyes polyethylene terephthalate fiber in bright blue shades of good light- and sublimation-fastness.

(b) When the 3′-diethylamino-p-acetanisidide coupler, used in part (a) of this example, is replaced by a chemical equivalent amount of 3′-[bis(2-acetoxyethyl)amino] p-acetanisidide, a blue dye of good light- and sublimation-fastness is obtained.

(c) When the 3′-diethylamino-p-acetanisidide used as coupler in part (a) of this example is replaced by a chemical equivalent amount of 3′-diethylamino-p-benzanisidide a blue dye of similar properties is formed.

EXAMPLE 3

(a) 2.25 parts of 2-amino-4-methoxy-6-nitrobenzothiazole are diazotized and coupled to 2.7 parts of 3′-[bis-(2-hydroxyethyl)amino]-p-acetanisidide according to the procedure described in Example 1(a). The new dye, obtained as a dark blue powder, has the formula:

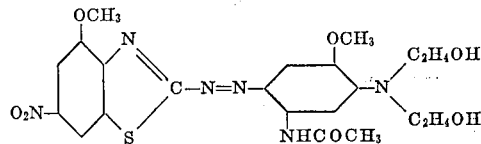

It dyes polyethylene terephthalate fiber in bright blue shades of good light- and sublimation-fastness.

(b) When the 3′-[bis(2-hydroxyethyl)amino]-p-acetanisidide used as a coupler in part (a) of this example is replaced by a chemical equivalent amount of 3′-amino-p-benzanisidide, a violet dye of good light- and sublimation-fastness is obtained.

By following the procedure of Example 1(a) and employing the coupling components listed in Table I, red to blue dyes are obtained which exhibit good strength and good fastness properties on polyester fibers.

TABLE I.—COUPLING COMPONENTS

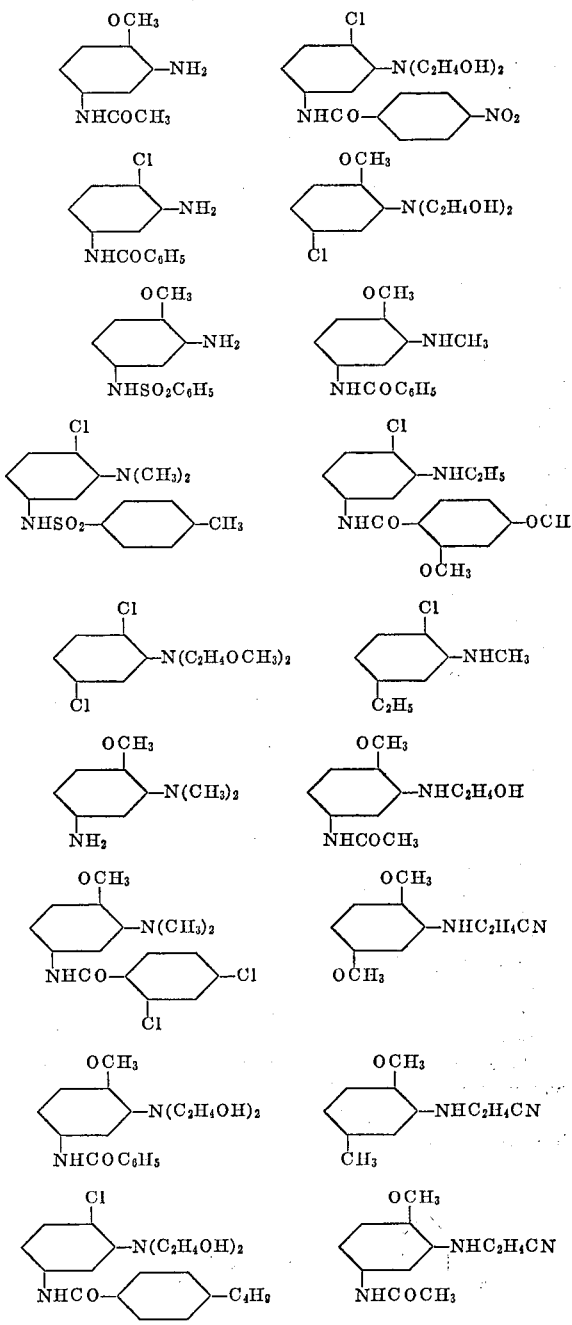

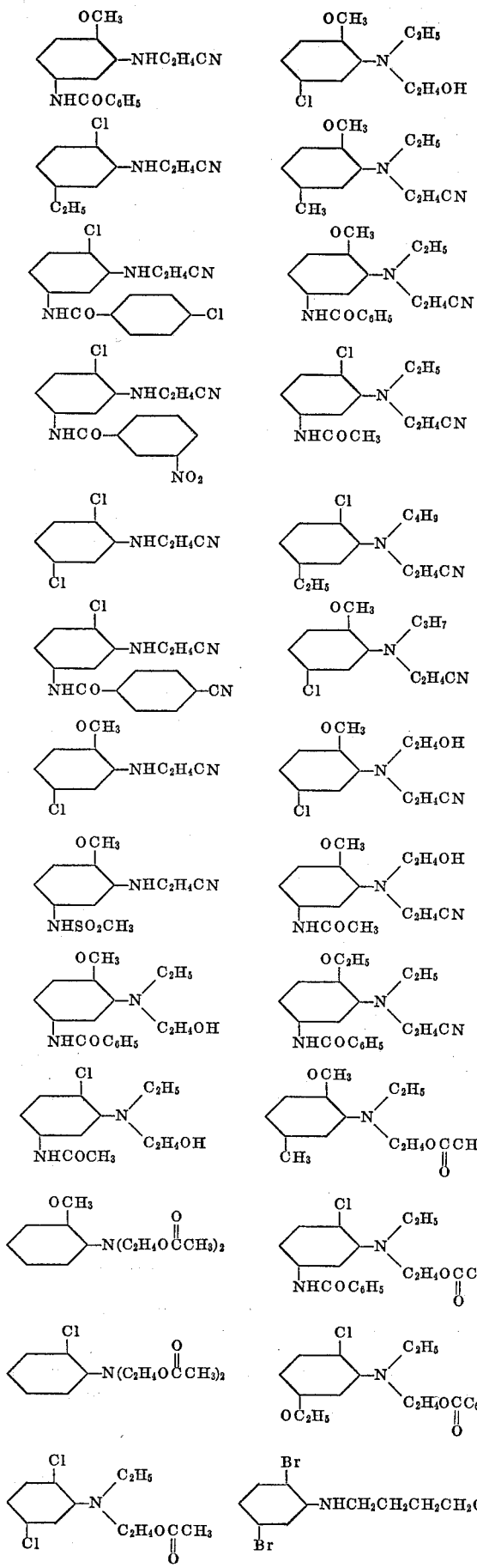
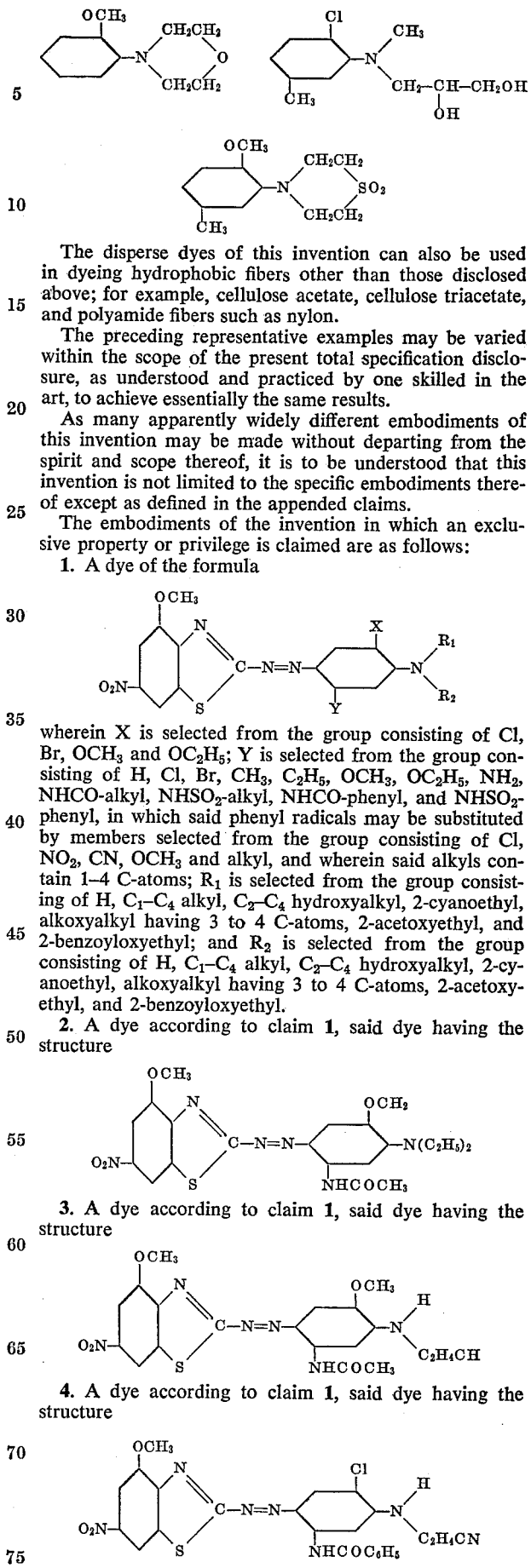

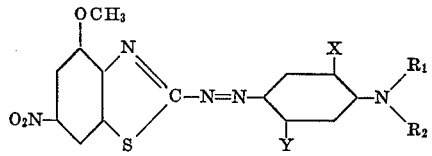

The disperse dyes of this invention can also be used in dyeing hydrophobic fibers other than those disclosed above; for example, cellulose acetate, cellulose triacetate, and polyamide fibers such as nylon.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A dye of the formula

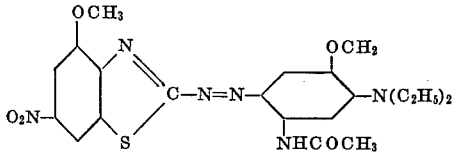

wherein X is selected from the group consisting of Cl, Br, $OCH_3$ and $OC_2H_5$; Y is selected from the group consisting of H, Cl, Br, $CH_3$, $C_2H_5$, $OCH_3$, $OC_2H_5$, $NH_2$, $NHCO$-alkyl, $NHSO_2$-alkyl, $NHCO$-phenyl, and $NHSO_2$-phenyl, in which said phenyl radicals may be substituted by members selected from the group consisting of Cl, $NO_2$, CN, $OCH_3$ and alkyl, and wherein said alkyls contain 1–4 C-atoms; $R_1$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, and 2-benzoyloxyethyl; and $R_2$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, and 2-benzoyloxyethyl.

2. A dye according to claim 1, said dye having the structure

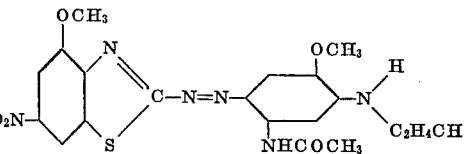

3. A dye according to claim 1, said dye having the structure

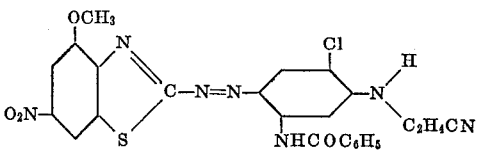

4. A dye according to claim 1, said dye having the structure

5. A dye according to claim 1, said dye having the structure
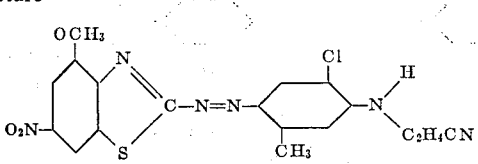
6. A dye according to claim 1, said dye having the structure
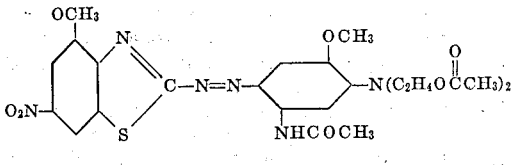
References Cited
UNITED STATES PATENTS
| | | | |
|---|---|---|---|
| 2,889,315 | 6/1959 | Bossard et al. | 260—158 XR |
| 2,891,942 | 6/1959 | Merion | 260—158 XR |
| 3,057,848 | 10/1962 | Dehn et al. | 260—158 |
| 3,101,988 | 8/1963 | Bossard et al. | 260—158 XR |
| 3,132,132 | 5/1964 | Suzuki et al. | 260—158 |
FOREIGN PATENTS
| | | |
|---|---|---|
| 587,134 | 4/1947 | Great Britain. |
| 896,232 | 5/1962 | Great Britain. |
FLOYD D. HIGEL, *Primary Examiner.*

UNITED STATES PATENT OFFICE
CERTIFICATE OF CORRECTION

Patent No. 3,405,118                        October 8, 1968

Mario Francesco Sartori

It is certified that error appears in the above identified patent and that said Letters Patent are hereby corrected as shown below:

Column 1, lines 65 to 72, the right-hand portion of the formula should appear as shown below:

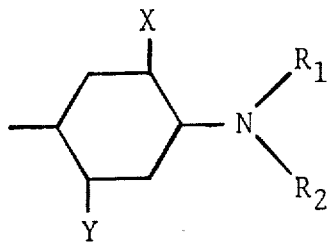

Column 5, lines 45 to 50, the right-hand formula, that portion reading $/C_2H_5$ should read $/CH_3$ Signed and sealed this 17th day of March 1970.

(SEAL)
Attest:

EDWARD M. FLETCHER, JR.             WILLIAM E. SCHUYLER, JR.
Attesting Officer                     Commissioner of Patents